(No Model.)
J. H. BELLAMY.
HAULING APPARATUS.
No. 535,884. Patented Mar. 19, 1895.
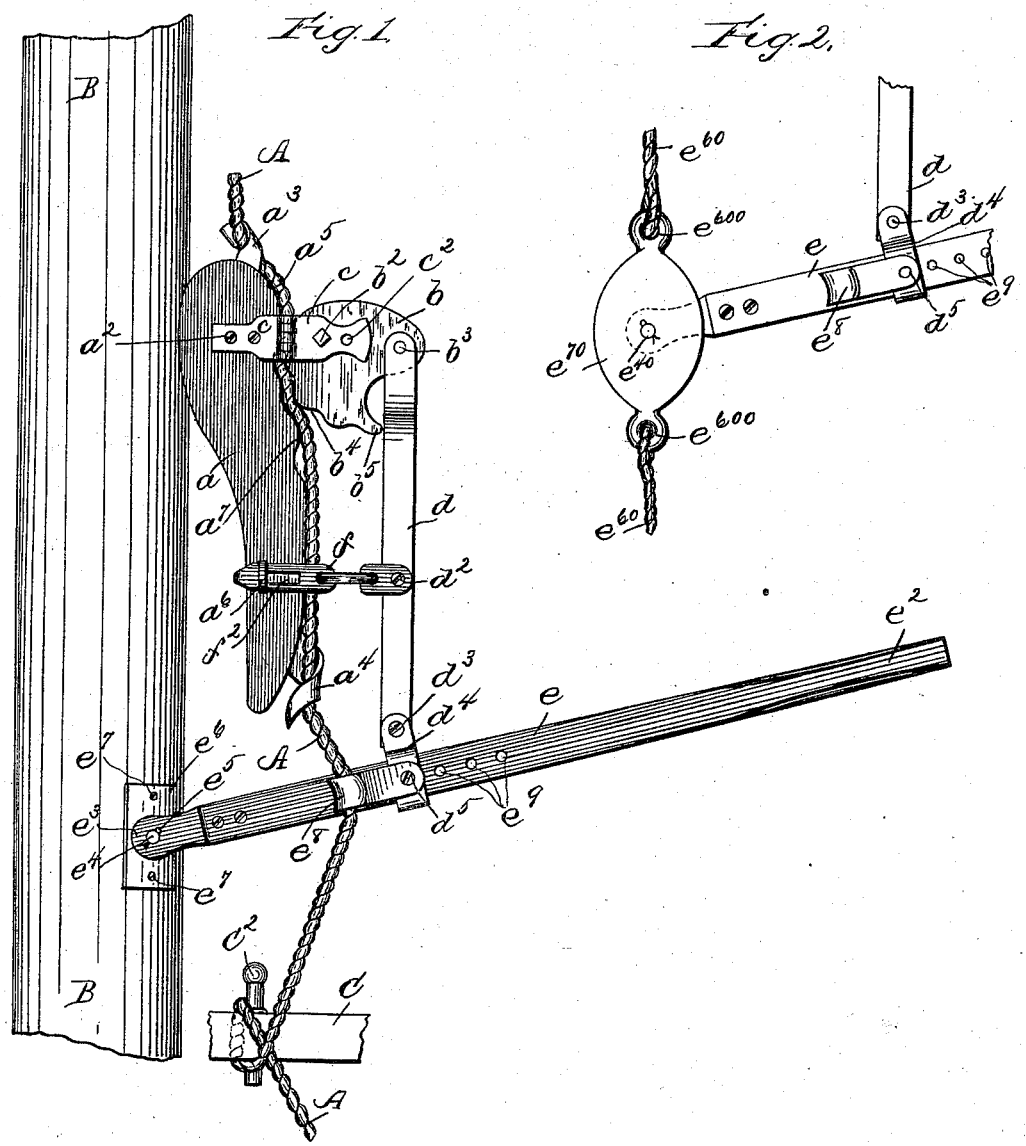
Witnesses
Jas. J. Maloney.
H. P. Livermore.
Inventor:
John H. Bellamy.
by Jos. P. Livermore
Att'y.
THE NORRIS PETERS CO., PHOTO-LITHO., WASHINGTON, D. C.

UNITED STATES PATENT OFFICE.

JOHN H. BELLAMY, OF KITTERY POINT, MAINE.

HAULING APPARATUS.

SPECIFICATION forming part of Letters Patent No. 535,884, dated March 19, 1895.

Application filed June 4, 1894. Serial No. 513,409. (No model.)

*To all whom it may concern:*

Be it known that I, JOHN H. BELLAMY, of Kittery Point, county of York, and State of Maine, have invented an Improvement in Hauling Apparatus, of which the following description, in connection with the accompanying drawings, is a specification, like letters on the drawings representing like parts.

The present invention relates to a hauling appartus and is embodied in a device especially adapted for use on board ship in conjunction with hoisting ropes or halyards, or in the fields or woods for hauling logs, or removing rocks or stumps from the ground, or branches from trees.

The apparatus is small and readily portable and can be used to advantage in any position where it is possible to secure a fulcrum pivot upon which to operate the lever.

The apparatus embodying the invention consists mainly of a gripping device connected to a lever having a relatively fixed fulcrum so that when the said lever is operated upon it will move the grip carrying with it any article such as a rope or cable held by the said grip. The grip itself consists of two members pivotally connected together and the rope or cable is passed between the two members in such a manner that when one of the said members is moved upon its pivotal connection in one direction it will approach the other member thus gripping the rope. The lever is so connected with one of the said members that when it is operated upon it will cause a relative movement such as above described of the said members until the rope is firmly gripped after which a further movement of the lever will carry with it both members of the grip and the rope held thereby. At the end of the full stroke of the lever said lever is returned to its normal or initial position such return movement moving the member of the grip to which the lever is connected in such a way as to release the rope allowing the grip to move up so that at the next downward stroke of the lever a fresh hold will be taken on the rope, which will thus again be hauled down at the next downward stroke of the lever. It is to be understood that the terms "up" and "down," &c., are used for convenience assuming that the rope is to be hauled vertically downward it being understood however, that the apparatus may be used to pull a rope in any desired direction.

Figure 1 is a side elevation of the device shown in connection with the mast of a vessel, and connected in operative position to a halyard passing down by the side of the said mast, the slack end thereof being made fast to a belaying pin, and Fig. 2 is a modification showing a portable fulcrum piece for the lever adapted to be attached by ropes or otherwise between any two fixed objects such as trees, when the apparatus is to be used on land.

The grip embodying the present invention consists mainly of a member $a$ which will be hereinafter referred to as the rope-member, and a member $b$ which will hereinafter be referred to as the lever-member, the said members consisting of flat pieces or plates of metal or other suitable material clamped or connected together by metal straps $c$ and provided with transverse pins $a^2$ and $b^2$ respectively, passing through said straps, upon which pins the said members are eccentrically pivoted. The said straps $c$ are preferably made in the form of a hinge as shown and permanently connected by the transverse screw or rivet $a^2$ to the rope member $a$ but detachably connected to the lever-member $b$ as by the removable pin $b^2$ so that the two can be separated and then clamped together around the rope thus obviating the necessity of threading the said rope between them, which might be a matter of considerable inconvenience. The strap $c$ may be provided as shown, with two or more holes $c^2$, any of which may be engaged by the pin $b^2$ thus rendering the distance between the members $a$ and $b$ adjustable for ropes of different sizes.

Upon the member $a$ are placed the guides $a^3$ and $a^4$ consisting of hook-shaped projections by which the rope A is engaged, the said guides being placed near the ends of the member $a$ so that the rope extending from one to the other lies substantially flat upon the gripping surface of said member, passing between the same and the guiding surface of the member $b$. In order to clamp the rope in the said grip and to move the same after it is thus clamped, the member $b$ is connected by a pivot $b^3$ to a link $d$ which is connected in turn to the lever $e$ the said lever being provided at one end with a handle portion $e^2$ and at the other end with a fulcruming portion $e^3$ shown as an eye adapted to fit and surround a projection, as $e^4$, upon which it may be secured by a split pin $e^5$. The said projection $e^4$ in this case is shown as part of a plate $e^6$ secured to the mast by means of bolts or cap screws $e^7$. The pivotal connection of the lever member $b$ to the rope member $a$, is at a point between the gripping surface of the said member which is adapted to engage the rope and the pivot $b^3$ by which the link $d$ is connected to said member, so that a downward move- of said link responsive to an operation of the lever tends to rock the member $b$ upon said pivotal connection and move the gripping surface thereof toward the gripping surface of the member $a$. The gripping surface of said member $b$ as shown in Fig. 1 is normally substantially parallel in its general direction to the face of the member $a$ extending along said face for some distance below the pivot $b^2$ so that when the said lever is operated upon as by exerting a downward force upon the handle $e^2$ the said member $b$ is rocked upon its pivotal connection, i. e. the pin, $b^2$ causing the lower end thereof to approach the face of the member $a$ thus gripping the rope A and carrying the said rope thus held as the lever is moved downward, it being obvious, moreover, that the upward strain or resistance of the rope tends to move the member $b$ in the same direction, thus tightening the grip as the strain increases.

The member $a$ is held substantially stationary with relation to the member $b$ by means of a link $f$ passing from the lower end of said member to the link $d$ to which it is pivotally connected by a screw or rivet $d^2$ while the rope is held in line with the member $a$ by means of the guides $a^3$ and $a^4$ and a guide $e^8$ upon the lever $e$.

In order to afford means for "easing off" the rope or cable which has been operated upon, as when it is desired to lower the halyard of a vessel without removing the apparatus from the mast, or to lower a rock or stump which has been lifted from the ground, the upper portion of the member $a$ is provided with an extension having a cam surface $a^5$ extending somewhat above the upper surface of the member $b$ while the rope A is held by this surface somewhat out of the line determined by the strain of said rope acting through the guide $a^3$ the tendency of the rope acting on the said guide being to rock the member $a$ on its pivot so that the surface $a^5$ will approach the upper surface of the member $b$. This tendency however, is resisted by the link $f$ and also by the lateral strain of the rope upon the guide $a^4$ when the slack rope is being taken up during the operation of the device. In order to remove this resistance when it is desired to lower the rope, the link $f$ is removably fastened to the member $a$ as by a button $a^6$ passing through the slot $f^2$ so that the said link can be released, allowing the member $a$ to rock on its pivot, the rope being engaged between the surface $a^5$ and the upper surface of the member $b$ thus affording a frictional grip upon the rope sufficient to retard it without holding it stationary. Obviously the surface $a^7$ or gripping surface of the member $a$ is by the same rocking movement removed from the surface $b^4$ or gripping surface of the member $b$ the rope being thus released by the normal working portion of the grip.

In order to keep the rope or cable at all times frictionally engaged by the grip members, so that the first downward movement of the lever may tighten the grip without any lost motion, the lower end of the member $b$ is formed into a toe or extension $b^5$ adapted to engage as shown, the edge of the link $d$ and prevent the member $b$ from rocking beyond a predetermined distance from its gripping position. The gripping surfaces $a^7$ and $b^4$ of the members $a$ and $b$ respectively, are preferably corrugated, as shown, thus affording the strongest possible grip. The power of the device may be adjusted within certain limits by connecting the link $d$ to the lever at different points, the said link being shown as provided with a clamping socket $d^4$ to which it is connected by a pin $d^3$ the said socket being attached by the lever by means of a bolt or pin $d^5$ which may be passed through any of the series of eyes or holes $e^9$ in said lever.

In Fig. 2 is shown a portable fulcrum socket $e^{70}$, which may be substituted for the plate $e^7$, shown in Fig. 1, the said socket being provided with a pin $e^{40}$, by which the lever $e$ is attached thereto. The said socket may also be provided with any suitable means for attaching to it a fixed object such as a tree or post, ropes or cables $e^{60}$, being shown attached thereto as by means of eyes $e^{600}$ at the ends of said socket.

In the use of the apparatus, the slack rope may be taken up and temporarily secured in any suitable way, as by making a loose half-hitch around any fixed object, the said slack being shown in Fig. 1, as passed around a belaying pin $C^2$ secured to the rail C near the foot of the mast B. The slack rope below the grip may thus be drawn taut, it requiring very little to hold it when passed around the belaying pin or similar fixed article in the form of a half hitch, so tied that the rope pulled in one direction to take up slack will slip, but when pulled in the opposite direction, as by the load upon it, will bind.

Various modifications may obviously be made in the specific construction of the apparatus, herein described, and it is therefore not intended to limit the invention to the exact form shown. It is to be understood, moreover, that the term "rope" includes any flexible connector by means of which an object to be operated upon may be connected to the hauling apparatus.

I claim—

1. A hauling apparatus comprising two pivotally connected grip members between which passes the rope or cable to be hauled, a lever having a relatively fixed fulcrum, said lever being connected to one of said members, as set forth, to first produce the relative movement of said members by which the rope is gripped and thereafter to move with said members and the rope gripped between them, and a connection between said lever and the other member substantially as described.

2. A hauling apparatus comprising two pivotally connected members, guides on one of said members adapted to hold the rope or cable to be operated upon in alignment with the gripping surface of said member, and a lever connected to the other member, said lever having a relatively fixed fulcrum, as and for the purpose set forth.

3. A hauling apparatus comprising a lever member and a rope member pivotally connected together, an operating lever having a relatively fixed fulcrum, said lever being connected by a link to said lever member, a cam extension on said rope member movable toward the upper surface of the lever member when said rope member is rocked on its pivot, a guide on said rope member for the rope, whereby said rope is withheld from its normal line of strain, and a removable connection between said rope member and said link whereby said guide is held in position against the normal strain of the rope, as and for the purpose described.

4. A hauling apparatus comprising two pivotally connected grip members between which passes the rope or cable to be hauled, means for adjusting the pivotal connection between said members to vary the distance between them, a lever having a relatively fixed fulcrum, and a link connected to one member of the grip and adapted to be connected to said lever at various points thereon, as set forth.

In testimony whereof I have signed my name to this specification in the presence of two subscribing witnesses.

JOHN H. BELLAMY.

Witnesses:
  E. F. SAFFORD,
  BENJAMIN L. LANCY.